United States Patent [19]

Reilly et al.

[11] Patent Number: 4,688,819
[45] Date of Patent: Aug. 25, 1987

[54] HITCH

[75] Inventors: Roger D. Reilly, Beaver Dam; Richard D. Teal; Robert A. Hoffman, both of Horicon, all of Wis.

[73] Assignee: Deere & Company, Moline, Ill.

[21] Appl. No.: 891,840

[22] Filed: Aug. 1, 1986

[51] Int. Cl.⁴ .............................................. B60D 1/04
[52] U.S. Cl. ............................ 280/461 A; 172/272; 172/439; 403/49; 403/327
[58] Field of Search .......... 280/461 A, 460 A, 456 A, 280/504, 514; 172/439, 272, 677, 749, 481, 466; 403/49, 327, 330; 248/305; 292/60; 294/104, 109

[56] References Cited

U.S. PATENT DOCUMENTS

| | | | |
|---|---|---|---|
| 2,605,686 | 8/1952 | Starr | 172/466 |
| 2,681,813 | 6/1954 | Seeburger | 280/456 A |
| 2,691,932 | 10/1954 | Sawyer et al. | 280/461 A |
| 2,775,180 | 12/1956 | DuShane | 280/461 A |
| 3,088,752 | 5/1963 | Dressen | 280/508 |
| 4,135,731 | 1/1979 | Lorenz et al. | 280/508 |
| 4,394,031 | 7/1983 | Barton et al. | 172/677 |
| 4,531,757 | 7/1985 | Kuhn | 280/461 A |

Primary Examiner—John A. Pekar

[57] ABSTRACT

A tractor has a typical three-point hitch with lower lift arms and an upper stabilizing arm comprising, in part, of a transverse horizontal rod extending between the lift arms. A pair of connecting structures are mounted on the implement and spaced on the order of the lift arms but being transversely offset therefrom. Each of the connecting structures includes a vertical plate having a U-shaped edge opening vertically for receiving the transverse bar. A link is mounted on the fore-and-aft plate and extends from one position in which it traverses the opening of the U so as to retain the bar in the nip area of the U-shaped edge and a position in which it extends vertically and opens up the U-shaped edge so that the bar may have ingress and egress from the nip area. A latching rod extends from the plate and there is provided an opening in the link that receives the latching rod. The link is mounted on the plate so that it may yield transversely to bypass the latching rod and is biased to lie alongside the plate and to be locked by the latching rod in its first position.

5 Claims, 6 Drawing Figures

HITCH

BACKGROUND OF THE INVENTION

It is heretofore been known to provide a hitch connection between a tractor and implement in which the basic attaching arrangement consists of a hook or U-shaped bracket on the end of an arm which receives a bar through the open side of the U or hook. In many instances, the bar is held in the bite or nip of the hook or U-shaped bracket by means of a latch member that is spring-loaded to block or cross the open side of the hook or U-shaped bracket once the bar is positioned. In some instances, the latch member is spring-loaded to yield as the bar enters the hook and to snap to a closed position once the bar has entered. Often, this type of latch is not reliable and accidental movement of the latch member may occur. Often, to assure reliability, there exists a complicated spring arrangement which lends itself to a rather expensive attaching mechanism.

When using an attachment arrangement on small utility type tractors, there are required reliability of the latch attachment, simplicity of the latch arrangement, and a relatively low-priced latching arrangment.

BRIEF DESCRIPTION OF THE INVENTION

With the above criteria in mind, it is a primary purpose of the invention to provide a reliable hitch attachment structure which is relatively low cost and which may be used without special tools or controls.

More particularly, it is the purpose of the present invention to provide a hitch structure on the implement composed of a pair of transverely spaced vertical plate structures having a downwardly opening U-shaped lower edges that receive a transverse bar normally mounted on the lower links of a three-point hitch arrangement on a tractor. A rod is fixed to the plates and projects outwardly therefrom. It is located on one side of the U-shaped opening. A link is supported on the opposite side of the U-shaped opening and is biasly mounted so that it can shift transversely. The link has an opening for receiving the rod. However, once the link is mounted on the rod, the bias mounting of the link causes the link to move into a side-by-side disposition with the plate and thereby retain the link in a position where it prevents egress from and ingress into the nip portion of the U-shaped opening. Thus, if a transverse bar on the lower links is positioned in the U-shaped opening, the link may be locked by first moving it transversely outwardly of the rod until the rod is in registry with the opening and then letting it back into a side-by-side disposition with the plate, thereby locking the bar in the U-shaped opening.

DESCRIPTION OF THE PREFERRED EMBODIMENT

Figure 1:
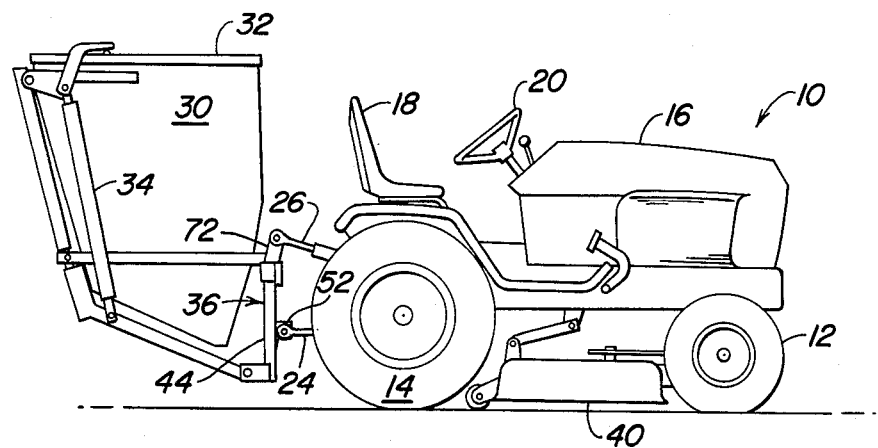
FIG. 1 is a side view of a tractor and a tractor mounted implement using the hitch structure of the present invention.
Figure 2:
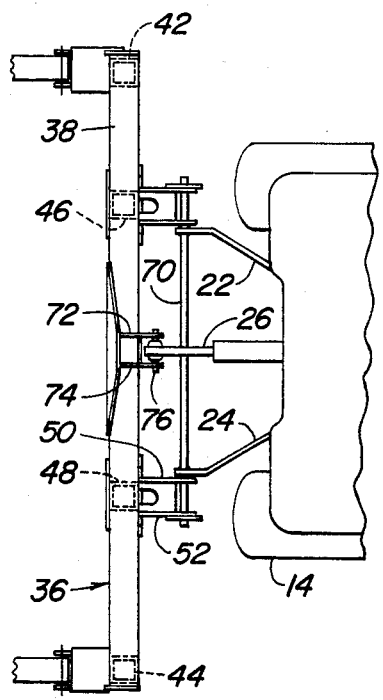
FIG. 2 is a plan view of the rear portion of the tractor and the front part of the implement frame and showing the hitch structure shown in FIG. 1.

Referring now to FIG. 1, a tractor 10 has front and rear wheels 12, 14, a tractor body 16, and an operator's station indicated in its general location by the operator's seat 18 and steering wheel 20. The tractor is provided with a typical three-point linkage that projects from the rear end and in which includes left- and right-hand lower lift arms 22, 24 that are hydraulically operated to be raised and lowered about front pivots that connect them to the tractor body 16. A centrally located upper stabilizer link 26 is positioned centrally with respect to the arms 22, 24. The link 26 is free to move vertically about a pivot connecting its front end to the tractor body 16 and in the particular form of link shown, it is of a turn-buckle type which means that the link may be extended or retracted manually.

The implement to be mounted on the tractor 10 is, for illustration purposes, of the dumpster type and includes a relatively large container 30 with a lid 32 which is hydraulically operated by cylinders 34 to raise the lid 32 and to dump the container 30. The container and its hydraulic structure is carried on a main frame structure, indicated in its entirety by the reference numeral 36. The frame structure 36 is, in general, a rectangular shaped upright structure having upper and lower horizontal cross bars 38, interconnected at their ends by upright structural members 42, 44. A pair of inner upright structural beams 46, 48 extend between the cross bars 38, and are separated transversely substantially the transverse distance between the left- and right-hand lift arms 22, 24. Extending rearwardly is additional frame structure that cradles under and carries the container 30 and the hydraulic structures 34. Details of the remaining frame work is not required for a full understanding of the present invention since the present invention relates substantially to the means for connecting the frame work 36 to the tractor 10. The tractor 10 has an underslung mower deck 40. A blower system, not shown, may be utilized to move grass clippings from the mower deck to the container 30. Should more details of this additional frame structure, as well as the refuge container 30, and its hydraulic system, the mower deck, and the blower system be desired, such may be had by reviewing U.S. Pat. No. 4,523,788 which issued to Keni K. Prasad on June 18, 1985.

Fixed to opposite sides of the upright beams 46, 48, either by welding or other means, are a pair of identical fore-and-aft extending plates 50, 52 on the left- and right-hand sides of the beams 46, 48. The plates project forwardly from the beams 46, 48 and have U-shaped lower edges 53 that open vertically and more particularly in a downward direction. A gusset spacer plate 55 extends between the upper edge of plates 50, 52. The respective structures are mirror images of one another. Therefore only that structure shown extending from the vertical beam 48 will be described. Supported on the outer plate 52 is a link 54. The particular mounting arrangement for the link 54 is a bolt 56 that extends through the end of the link 54 and the plate 52 to an end terminating between the plates 50, 52. The bolt 56 carries at that end a nut and washer combination 58. Positioned on the shank of the bolt 56 and between the washer and nut combination 58 and plate 52 is a spring 60. The head of the bolt 56 is outboard of the link 54.

Figure 3:
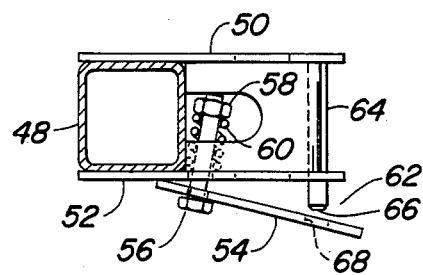
FIG. 3 is an enlarged plan view of the portion of the hitch structure on the right side of the implement.

Consequently, the spring tends to bias the link 54 into a side-by-side relationship with respect to the outer surface of the plate 52. However, the free end of the link 54 may be moved transversely away from the plate 52 as is shown in FIG. 3, to provide a transverse gap, indicated at 62, between the link 54 and the portion of the plate 52 on the forward side of the U-shaped opening.

Figure 4:
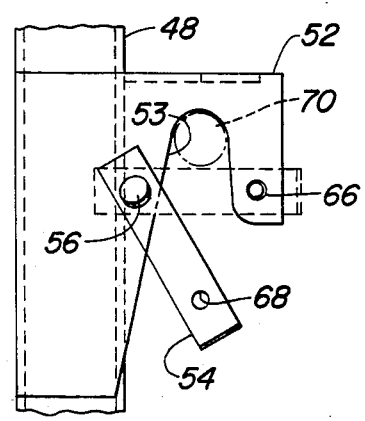
FIG. 4 is an side view of the hitch structure shown in FIG. 3.

Fixed to and extending between the plates 50, 52 and on the opposite side of the U-shaped opening 53 then the pin 56, is a latching rod 64 that has its outer end 66 terminating within the confines of the transverse gap 62. The link 54 has an opening 68 that may be in registry with the end portion 66 of the rod 64 and, as clearly apparent from viewing FIGS. 3, 4, may receive the end 66 of latching rod 64 so as to retain the link 54 in a position to prevent ingress into and egress from the nip portions of the U-shaped openings 53.

Mounted on the rearmost ends of the lift arms 22, 24 is a transverse bar 70 that extends the full width between the lift arms. Also, welded to the upper cross beam 38 of the main frame 36 are a pair of transversely spaced but parallel brackets 72, 74 that have aligned openings therein for receiving a pin 76 that connects the stabilizer link 26 to the brackets 72, 74 while the drawing shows the lift links 22, 24 to be inboard of the respective pairs of brackets 50, 52, it should be understood that they could be outboard for a different size of implement and frame, and consequently the hitch connection would obviously be on the inner side of the lift links.

When it is desired to mount the implement from the ground position on the tractor, the tractor is backed into the area of the frame 36 and the bar 70 is raised into the U-shaped openings 53 until the bar seats itself in the nip portions of those openings. The link 54 may then be raised and moved transversely away from the plate 52 to create the gap 62 and until the opening 68 comes in registry with the end 66 of the pin 64. It may then be released and the link 54 will move on the rod 64 until it reaches a position of side-by-side disposition with the plate 52. The spring 60 will hold the link 54 in this position and thus, the rod 70 will be locked in its position of blocking U-shaped opening 53. At this time, the upper link 26 of the three-point hitch may be extended and retracted for receivng the pin 76 and connecting the link 26 to the brackets 72, 74.

Figure 6:
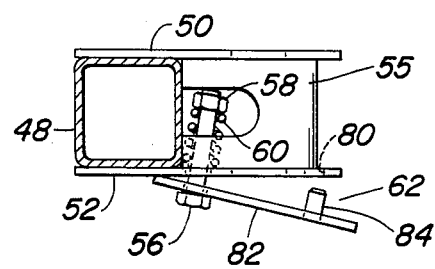
FIG. 6 is a view similar to FIG. 3 but showing the modified form of the invention of FIG. 4.
Figure 5:
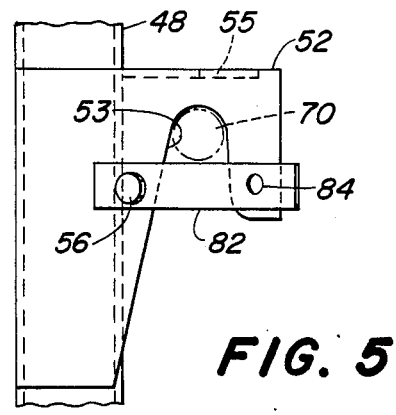
FIG. 5 is a view similar to FIG. 4 but showing a modified form of the invention.

Referring now to the modification shown in FIG. 6, the main beam 48 and the respective plates 50, 52 are identical with the exception that the plate 52 has an opening 80 therein substantially at the location that in the previous form of the invention, rod 64 appeared. A link 82 is mounted on the plate 52 in the same manner that the previous link 54 was mounted. Link 82 carries, at its forward end, a stud member 84 that terminates at an end that may fall within the confines of the transverse gap 62 between the link 82 and the plate 52. When it is desired to lock the rod 70 in the manner shown in FIG. 5, the link 82 is brought upwardly and forwardly until the pin 84 comes in registry with the opening 80. At this time, the link 82 may be released and the pin or stud 84 will move into the opening 80 where the link will then prevent egress from the U-shaped opening.

We claim:

1. A hitch connection between two vehicles including a pair of opposed vertical and fore-and-aft extending plates mounted on one of the vehicles with matching and tansversely spaced U-shaped edges opening vertically for receiving a transverse bar on the other of the vehicles; a link mounted on at least one of said plates to pivot vertically on a transverse axis in fore-and-aft offset relation to said U-shaped edges and to swing between a first position in which said U-shaped edges are open to ingress and egress by said transverse bar and a second position in which said link extends across the U-shaped edge to prevent ingress and egress of said bar into and from, respectively, the nip areas of said U-shaped edges to a free end portion positioned alongside a portion of said one plate on the opposite side of said U-shaped edge than said pivot, said link being mounted so as to yieldably permit separation between said free end portion and said portion of said one plate to thereby permit a transverse gap therebetween, a latch rod mounted on one and extendable through an opening in the other of said portions when said link is in position to prevent ingress and egress of the bar into and from the nips of said U-shaped edges, said rod terminating at an end that, when separation of said portions occur, is in the confines of said transverse gap.

2. The invention defined in claim 1 in which the latch rod is rigid with and extends horizontally and transversely between said plates and has its end portion outboard of one of said plates and in the confines of said transverse gap and said link has the aforesaid opening therein for receiving the end portion.

3. The invention defined in claim 1 in which the latch rod is rigid with said link and projects horizontally therefrom, and said opening is in said one wall.

4. A hitch connection between a tractor and implement wherein the tractor has a pair of transversely spaced fore-and-aft extending lower lift arms and an upper stabilizing arm comprising: a bar extending between and mounted on the distal ends of said lift arms, fore-and-aft extending vertical plates mounted on the implement in transverse offset relation to but substantially the transverse distance between the lift arms, said vertical plates having matching U-shaped lower edges opening downwardly for receiving the transverse bar; a link mounted each of said plates to pivot on a transverse axis in fore-and-aft offset relation to the U-shaped edges and to swing vertically between a first position in which said U-shaped edges are open to ingress and egress by said transverse bar and a second position in which said link extends across the U-shaped edge to prevent ingress and egress of said bar into and from, respectively, the nip areas of said U-shaped edges to a free end portion of the link positioned alongside the respective plate and on the opposite side of said U-shaped edge than said pivot, said link being mounted so as to have adjoining surfaces in substantial side-by-side relation between a surface of said end portion and a surface of a portion of said one plate and being yieldable to permit said free end portion to shift transversely away from said portion of said one plate to thereby provide a transverse gap therebetween, a rod fixed to each of said plates and extendable through an opening in the respective link when said link is in its position to prevent ingress and egress of the bar into and from the nips of said U-shaped edges, said rod terminating at an end that is in the confines of said transverse gap; and an upper link connecting structure on the implement for securing the upper stabilizing link to the implement.

5. A hitch connection between a tractor and implement wherein the tractor has a pair of transversely spaced fore-and-aft extending lower lift arms and an upper fore-and-aft extending stabilizer arm comprising: a bar extended between and mounted on the distal ends of said lift arms; a transversely spaced connecting structure on the implement spaced generally on the order of the lift arms and transversely offset from the lift arms, each structure including a pair of opposed vertical and fore-and-aft extending plates mounted on the implement with matching U-shaped edges opening vertically for receiving the transverse bar, a transverse horizontal latching rod fixed to both of said plates and extending outwardly from one of said plates to an end transversely offset from the surface of said one of said plates; a link mounted on said one of said plates to pivot on a transverse axis in fore-and-aft offset relation to said U-shaped edges and to swing vertically between a first position in which said U-shaped edges are open to ingress and egress by said transverse bar and a second position in which said link extends across the U-shaped edge to prevent ingress and egress of said bar into and from, respectively, the nip areas of said U-shaped edges to a free end portion of the link positioned alongside said one of said plates and on the opposite side of said U-shaped edge than said pivot, said link being biasly mounted so as to normally be in substantial side-by-side relation with said one of said plates but being yieldable transversely to permit said free end portion and said portion of said one wall to shift transversely away from one another to provide a transverse gap therebetween sufficient to permit the link to bypass the end of said latching rod, said link having a rod-receiving opening therein that is in transverse registry with and receives the end of the latching rod when the link is in its position to prevent ingress and egress of a bar into and from the nips of said U-shaped edges; and an upper link connecting structure on the implement securing the upper stabilizing link to the implement.

* * * * *

UNITED STATES PATENT AND TRADEMARK OFFICE
CERTIFICATE OF CORRECTION

PATENT NO. : 4,688,819

DATED : 25 August 1987

INVENTOR(S) : Roger D. Reilly, Richard D. Teal and Robert A. Hoffman

It is certified that error appears in the above-identified patent and that said Letters Patent is hereby corrected as shown below:

In claim 1, line 4, delete "tansversely" and insert therefor -- transversely -- .

Signed and Sealed this

Twenty-ninth Day of November, 1988

Attest:

DONALD J. QUIGG

Attesting Officer

Commissioner of Patents and Trademarks